US010706889B2

(12) United States Patent
Thomée et al.

(10) Patent No.: US 10,706,889 B2
(45) Date of Patent: Jul. 7, 2020

(54) SELECTIVE CONTENT INSERTION INTO AREAS OF MEDIA OBJECTS

(71) Applicant: Oath Inc., New York, NY (US)

(72) Inventors: Bart Thomée, San Francisco, CA (US); Ioannis Kalantidis, San Francisco, CA (US); Clayton Ellis Mellina, Santa Clara, CA (US); Simon Osindero, London (GB)

(73) Assignee: Oath Inc., New York, NY (US)

( * ) Notice: Subject to any disclaimer, the term of this patent is extended or adjusted under 35 U.S.C. 154(b) by 139 days.

(21) Appl. No.: 15/204,450

(22) Filed: Jul. 7, 2016

(65) Prior Publication Data

US 2018/0012630 A1 Jan. 11, 2018

(51) Int. Cl.
*G11B 27/036* (2006.01)
*G11B 27/28* (2006.01)
*G06K 9/46* (2006.01)
*G06K 9/00* (2006.01)
*H04N 5/272* (2006.01)

(52) U.S. Cl.
CPC ........ *G11B 27/036* (2013.01); *G06K 9/00624* (2013.01); *G06K 9/46* (2013.01); *G11B 27/28* (2013.01); *H04N 5/272* (2013.01)

(58) Field of Classification Search
CPC ... G11B 27/034; G11B 27/036; G11B 27/105; H04N 1/38; H04N 5/272; H04N 5/85; H04N 21/23424; H04N 21/812; G06K 9/46; G06Q 30/0222; G06Q 30/0601; G06Q 30/0254
USPC ......... 386/278, 248, 282; 348/586; 382/163, 382/282; 705/14.23, 14.52
See application file for complete search history.

(56) References Cited

U.S. PATENT DOCUMENTS

| | | | |
|---|---|---|---|
| 6,711,291 B1 | 3/2004 | Stubler et al. | |
| 7,574,038 B1* | 8/2009 | Cohen | G06T 7/215 382/163 |
| 8,234,218 B2* | 7/2012 | Robinson | G06Q 30/0222 705/14.23 |
| 8,352,321 B2 | 1/2013 | Mei et al. | |
| 2009/0083140 A1* | 3/2009 | Phan | G06Q 30/02 705/14.52 |
| 2010/0027961 A1* | 2/2010 | Gentile | G06T 5/50 386/278 |
| 2016/0234564 A1* | 8/2016 | Holyoak | H04N 21/812 |
| 2016/0342863 A1* | 11/2016 | Kwon | G06K 9/4647 |

* cited by examiner

*Primary Examiner* — Thai Q Tran
*Assistant Examiner* — Syed Y Hasan
(74) *Attorney, Agent, or Firm* — Cooper Legal Group, LLC (57) ABSTRACT

One or more computing devices, systems, and/or methods for selective content insertion into areas of media objects are provided. For example, a media object (e.g., an image or video), is selected for composition with content, such as where a message, interactive content, a hyperlink, or other types of content is overlaid or embedded into the media object to create a composite media object. The content is added into an area of the media object that is selectively identified to reduce occlusion and/or improve visual cohesiveness between the content and the media object (e.g., added to an area with a similar or complimentary color, having an adequate size with spare amounts of visual features such as a soccer player, a ball, or other entity, etc.). In this way, the content may be add into the area of the media object to create a composite media object to provide to users.

20 Claims, 9 Drawing Sheets

SELECTIVE CONTENT INSERTION INTO AREAS OF MEDIA OBJECTS

BACKGROUND

Users may interact with various types of media objects comprising a wide range of information. In an example, a user may view a beach image shared by another user through an image sharing service. In another example, the user may read a videogame console article published through a videogame website. In another example, the user may watch a live video stream of a soccer game through a video streaming app. In another example, the user may listen to a podcast through an online radio station. Many content providers may spend substantial amounts of time and computing resources attempting to combine content (e.g., a message, a link, an image, an interactive game, etc.) and media objects (e.g., an image, video, and/or audio). For example, a website may play an initial video before playing a requested video (e.g., a videogame website may force users to watch a video about a brief history of the website before being able to watch a videogame review show). In another example, a news website may display an image overlaying a news article. Unfortunately, the combination of content and media objects may be arbitrary, random (e.g., subject matter of the image may have little to do with subject matter of the article, such as a weather image overlaying an article about a corrupt politician), and/or annoying (e.g., the image may obscure part of the article). Thus, manual and human intervention are required to improve the combination of content and media objects so that they better match.

SUMMARY

In accordance with the present disclosure, one or more computing devices and/or methods for selective content insertion into areas of media objects are provided. An area may correspond to a spatial area in an image, a spatiotemporal area in a video (e.g., a spatial area within a sequence of frames over a time period of the video), a temporal area in an audio file (e.g., a 5 second time period of the audio file), etc. In an example, content, such as text, an image, interactive content, a logo, a watermark, a sound, etc. may be added to a media object, such as an image, video, or audio, to create a composite media object. In particular, an area within the media object may be identified for insertion of the content so that the resulting composite media object does not appear to be arbitrary, random, or annoying, but may be complimentary.

In an example of selecting a media object into which content can be added, a content feature of the content may be identified (e.g., a topic or theme of the content, a color distribution of the content, a size of the content, and/or any other visual, aural, temporal, or semantic aspect of the content that may be identified from metadata, annotations, feature recognition functionality, image recognition functionality, etc.), and used to query a media object repository to identify a media object with features similar or complimentary to the content feature. A criteria for pairing the content with media objects may be identified (e.g., a color scheme, a font type, a semantic topic or theme, an occlusion threshold of the content occluding a visual feature within a media object, a display duration of the content for a video media object, an audio feature such as frequency, pitch, detected silence or background noise, etc., a media type preference such as image, video, or audio, and/or other preferences for selecting a media object for pairing with the content). Content may be visually paired (e.g., a visual message may be added into an area of an image), temporally paired (e.g., the visual message may be added into a sequence of frames occurring during a time period of a video), and/or aurally paired (e.g., an audio message, a jingle, a subliminal sound, and/or any other sound may be added into a particular time period of an audio track or stream). The media object repository (e.g., images from a social network or photo sharing service, videos from a video streaming service, a source of a live audio stream, etc.) may be queried using the content feature and/or the criteria to identify a media object associated with the content feature and/or the criteria (e.g., a media object having features such as a color distribution, topic or theme, etc. best matching the content feature and/or criteria). For example, the content may comprise a message "get ready for the playoffs tonight!", and thus an image media object with exciting colors such as red, a sports or television theme, an area with sufficient space to fit the content without occluding visual features or aural features (e.g., sounds, such as a person speaking) of the media object above a threshold amount (e.g., a background area, a whitespace area, an area not comprising a visual feature such as a person, a sports score, a car, or other entity, a time period with adequate silence or background noise to fit audio content without overlapping non-background sounds of an audio media object such as a conversation, etc.), and/or other features may be selected.

In an example, the area within the media object may be identified for placement of the content based upon the content fitting within the area without occluding visual features or aural features of the media object above a threshold (e.g., a minimized amount of occlusion). In an example where the media object is a video, frames of the video may be evaluated to identify a sequence of frames (e.g., a number of frames corresponding to a display timespan for displaying the content) and/or the area where placement of the content into the area of the sequence of frames has reduced or minimized visual occlusion of visual features and/or where a frame does not have visual occlusion over a maximum allowed threshold. In an example where the media object is an audio media object, the content (e.g., an audio message, a jingle, music, a subliminal sound, or any other sound) may be inserted into a temporal area (e.g., a particular time period of the audio media object) that reduces overlap of the content with non-background noise of the audio media object. For example, the content may be added into a period of silence or mere background noise of the audio media object as opposed to when a person is speaking (e.g., audio features, such as pitch, frequency, detected sound, detected voices, detected silence, etc., may be used to identify the particular time period with reduced audio overlap between the audio media object and the content). In an example, the content and/or the media object may be modified to reduce visual or aural occlusion and/or improve cohesiveness between the content and the media object (e.g., a size of the content may be reduced to reduce occlusion; a color scheme of the media object may be modified to better match a color scheme of the content; etc.).

The content may be added to the media object to create the composite media object. In an example, the message "get ready for the playoffs tonight!" may be overlaid or embedded into a top right area of a sports image media object that depicts a mascot and a sports cheering section of a sporting event. For example, the top right area may have been identified so that the message does not occlude the mascot and/or cheering fans above the threshold. The composite media object may be created offline (e.g., variations of the message being added to different areas of the media object and/or into other media objects may be pre-generated, tested with users, and/or ranked based upon such testing) or in real-time (e.g., in response to a user interface such as a webpage requesting composite media objects for display, and thus the media object may be selected for composition with the message based upon properties of a user accessing the webpage and/or properties of the webpage such as a color or topic of the webpage). In this way, the composite media object may be provided to the user.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
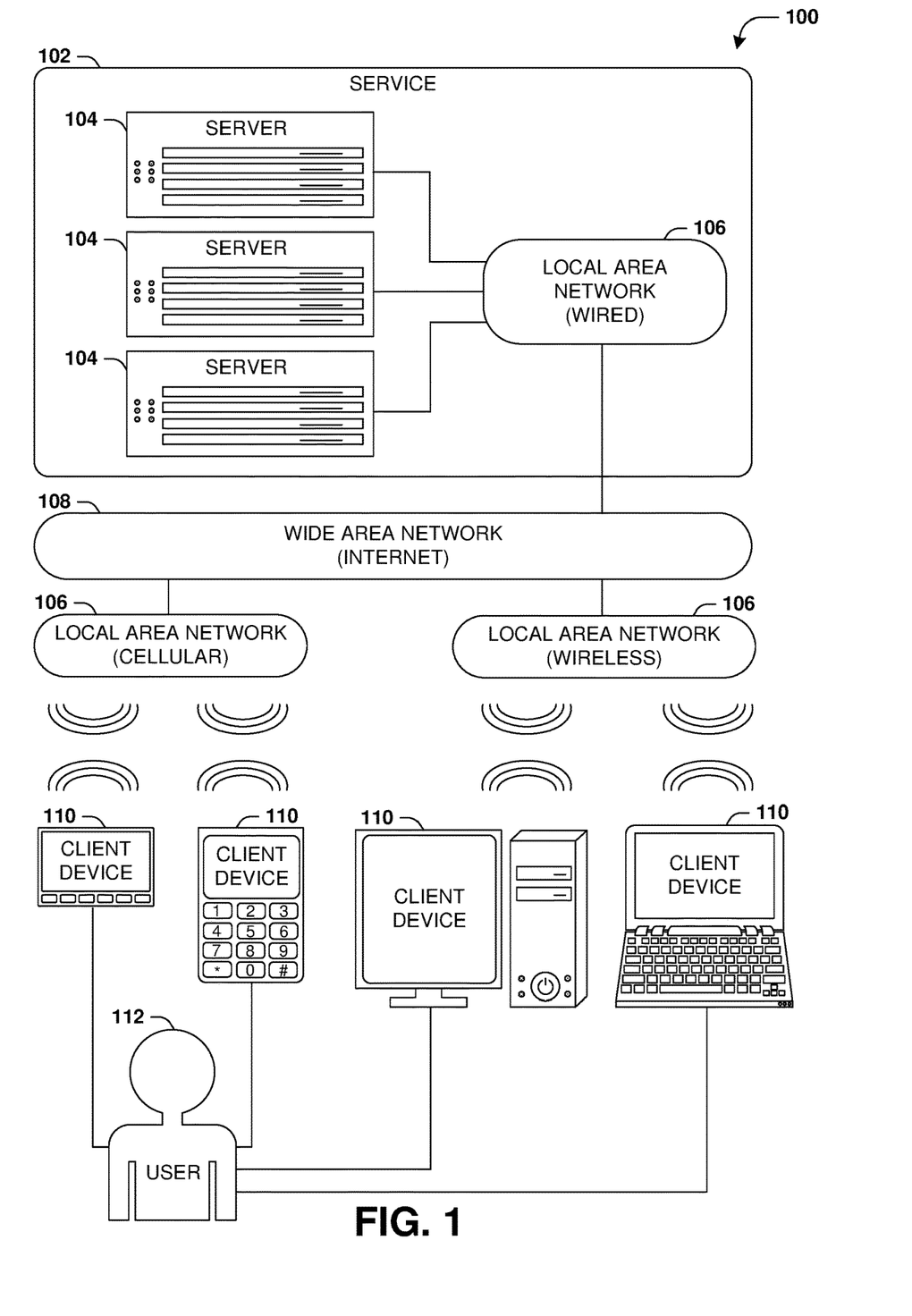
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
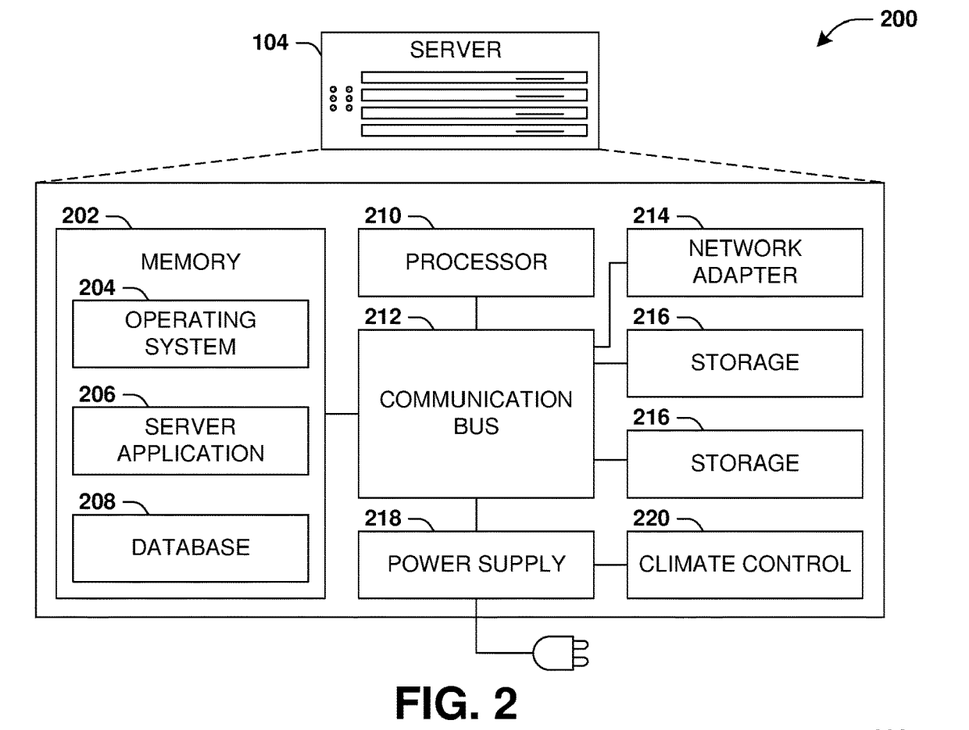
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
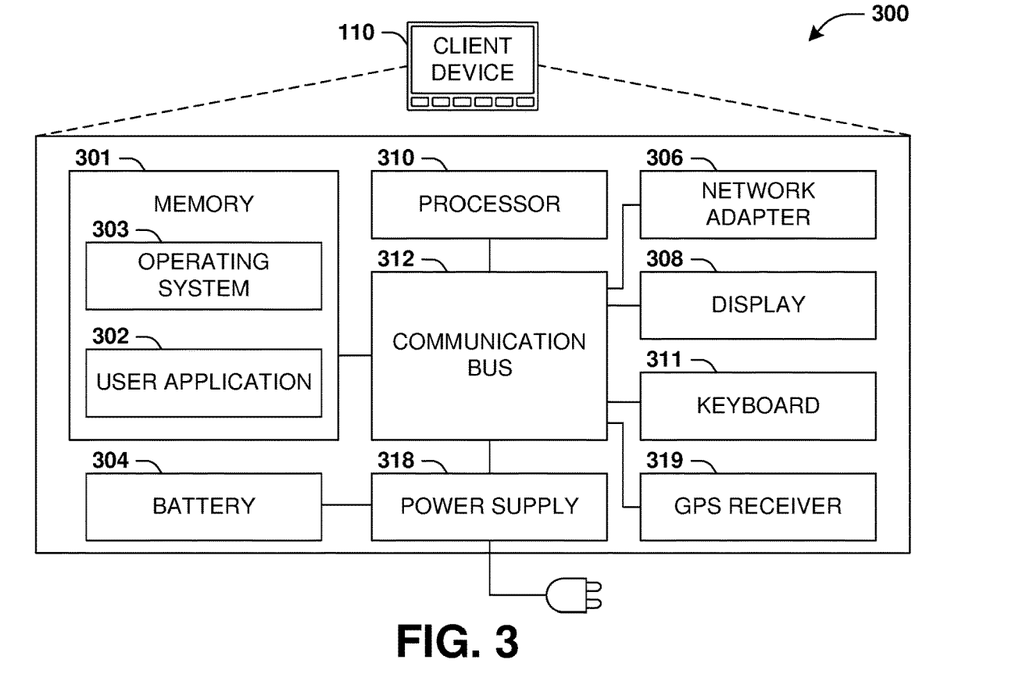
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for selective content insertion into areas of media objects are provided. For example, content, such as a message, a logo, an interactive game, or other content, may be added to a media object, such as an image or video. A media object may be selected for composition with the content based upon content features of the content (e.g., a media object may be selected based upon the media object having a similar or desired color scheme, topic or theme, semantic content, font, etc.) and/or optionally criteria (e.g., a user may specify a desired color scheme, font type, semantic content, media type, etc. for selecting the media object). In this way, the content may be added to the media object to create a composite media object to provide to a user.

Various challenges may arise when compositing content and media objects together. In an example, adding the content into the media object may occlude relatively important visual features or aural features such as a sports score of a video stream of a sporting event, a person depicted within a family portrait image, a soccer ball depicted within a sports image, a voice of a news anchor, etc. Accordingly, as provided herein, the media object may be evaluated to identify an area within the media object (e.g., a portion of an image, an area within one or more frames of a video, a time period in an audio stream, etc.) that reduces occlusion, such as an area not comprising a visual feature such as a recognized entity (e.g., a person, an election result, a news headline, a car, etc.) or aural features (e.g., an announcement of a sports score). Once the content has been inserted into the media object, a verification may be performed to check that the content is not occluding visual features such as a recognized entity or aural features above a threshold (e.g., no more than 5% occlusion for a person, no more than 10% occlusion for a car, no more than 2 seconds of audio overlap with non-background sound, and/or other thresholds specified for various types of visual features). Also, the content and/or the media object may be modified to reduce occlusion, such as by adjusting a size of the content, adjusting a volume of the content. In addition, the content may be inserted into an area that may relate more or less to a topic or theme of the content, thus providing cohesiveness between the content and the media object (e.g., a message "swim with dolphins" may overlay the water in a beach scene instead of the sand; a soccer message may be inserted into a time period of a podcast relating to sports; etc.).

In another example, adding the content into any position within the media object may result in a visually distasteful composite media object such as where a color scheme, a topic, or a theme clash. Also, the combination may seem arbitrary, random, and/or annoying (e.g., a house image may overlay a soccer player, and thus may seem irrelevant to a user; the house image may overlay non-fixed areas of a video and thus may appear to bounce around, which may annoy a user; etc.) without extensive manual and human intervention for compositing content into areas of media objects that are complimentary. Accordingly, as provided herein, features of the content and media objects, such as features of areas within a media object, may be identified and compared to identify a media object and/or an area within the media object that has a similar visual style, adequate empty space (e.g., a background or other area not comprising interesting entities, such as the soccer player), adequate silence or background noise, or similar theme that will integrate together for creating the composite media object (e.g., the content is blue, so an area within the media object with cool colors instead of warm colors may be chosen; the content may relate to a videogame violence policy, so a media object about a shooter videogame may not be chosen; etc.).

In another example, adding the content to real-time media objects such as virtual reality, augmented reality, a video, a live audio stream, etc. may be difficult due to the real-time nature of such media objects (e.g., a message may overlay and occlude a street that the user is attempting to cross during an augmented reality experience, which may be distracting and/or dangerous). Accordingly, as provided herein, playback of a real-time media object to a user may be delayed in order to predict an area that will have reduced (e.g., minimized) occlusion of visual features (e.g., predicted to be empty of interesting entities) of the real-time media object (e.g., changes in position of an entity, such as a person, may be used to predict subsequent changes in position of the entity over time). In another example, video and/or audio may be delayed by a desired length in frames/samples of the content for insertion. Thus, the frames/samples can be buffered and evaluated in complete sequence to determine whether or not the content fits. Addition of the content into the real-time media object may be stabilized, such as by adding the content to a specific fixed area so that the content does not move, such as jump, around between frames. In another example of stabilization, an area within a video is identified such as center circle of a hockey field, and content is overlaid and bound to the area even though a camera view may move during the video (e.g., during the video, different portions of the hockey field may be displayed and the content may remain overlaid within the area such as the center circle of the hockey field). In an example, entities, such as the street being viewed through the augmented reality experience may be identified as relevant (e.g., based upon location data of a device of the user indicating that the user is traveling towards the street), and thus areas depicting such entities may be excluded as areas into which the content may be added.

In another example, content may be added to media objects in real-time on demand such as when requested by a user interface, which may provide storage efficiency and savings compared to storing a large repository of combinations of composite media objects for subsequent use. Storage efficiency and savings may also be improved by creating a set of composite media objects that are tested and ranked based upon user interaction with the composite media objects so that merely those composite media objects with desired ranks are maintained while others are deleted from storage. Otherwise, without using the techniques disclosed herein, composition would be performed offline by humans, and thus media objects and/or areas within media objects may not be selected based upon real-time considerations such as features of the user and/or user interface.

Figure 4:
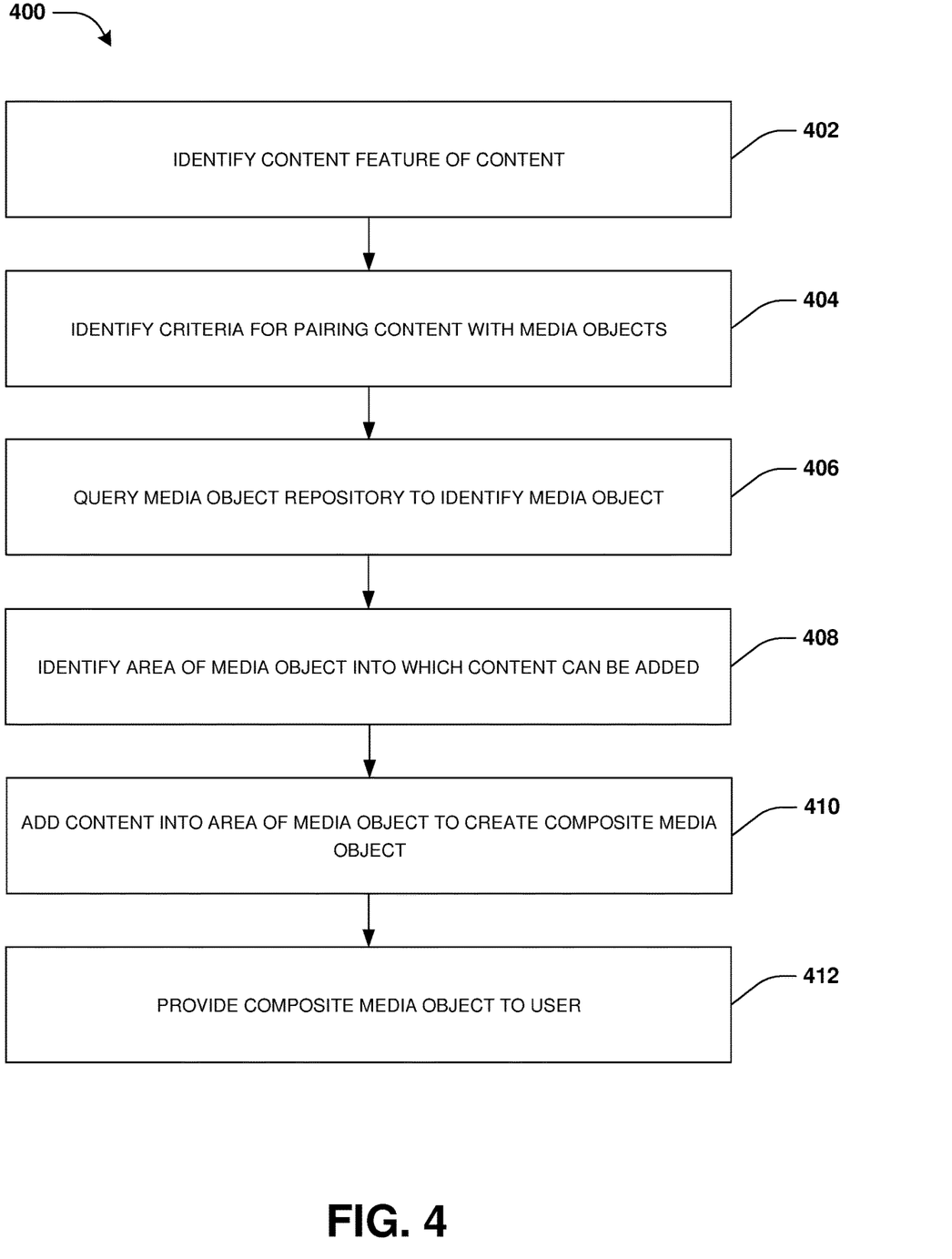
FIG. 4 is a flow chart illustrating an example method for selective content insertion into areas of media objects.

An embodiment of creating composite media objects is illustrated by an example method 400 of FIG. 4. In an example, composite media objects may be created offline so that such composite media objects are readily available to provide to users when requested. In another example, composite media objects may be created in real-time in response to a request from a user interface for composite media objects to display through the user interface to a user. The composite media object may be created by adding, such as embedding or overlaying, content (e.g., text, interactive content, an image, a logo, a watermark, a game, a hyperlink, or any other visual content) into the media object (e.g., an image, a video, an augmented reality experience, a virtual reality experience, or any other object into which visual content may be added). Accordingly, as provided herein, a media object and/or area within the media object may be selected for composition with the content.

At 402, a content feature of the content may be identified. In an example, the content feature may comprise a size of the content (e.g., pixel height and width of a message "How to ride a jet ski" that links to a jet ski article), a visual scheme of the content (e.g., a color scheme or distribution, a font, etc.), an audio scheme of the content (e.g. a frequency scheme or distribution, a sound, etc.) a topic of the content (e.g., a topic or theme such as water sports, vacation, activity, etc.), and/or any other type of feature (e.g., a sentiment, an aesthetic, a shot boundary of image content, a genre, a semantic interpretation, a dialog, etc.).

At 404, a criteria for pairing the content with media objects may be optionally identified. In an example, the criteria may be a user specified criteria (e.g., the user may specify an excitement criteria such that media objects with a red color theme, a sports theme, a crowd sound, denoting high energy activities, and/or other high excitement themes may be selected; the user may specify a calm criteria such that media objects with a blue color theme, a quiet audio theme, a depicting a peaceful scene, and/or other calming themes may be selected; etc.). The criteria may comprise a color scheme, a font type, semantic content (e.g., a topic or theme such as race cars, a family vacation, people playing sports, etc.), an occlusion threshold (e.g., a certain percentage of a visual feature such as a recognized entity (e.g., a person, a building, a sports score, etc.) or aural features such as a person speaking that may be occluded by content), a display duration for displaying the content within a video media object, a media type (e.g., preference of an image, a video, augmented reality, a live stream of video, etc.), and/or a variety of other types of criteria. In an example, user signals of the user (e.g., the user may be accessing the user interface requesting the composition of media objects) may be evaluated to identify an interest of the user as the criteria (e.g., a user profile, a social network post, a browsing history, a location of a device hosting the user interface, an email, a calendar entry, and/or other information may be used to determine that the user has an interest in cars, and thus media objects depicting cars may be interesting to the user). In another example, the user interface may be evaluated to identify a context of the user interface as the criteria (e.g., the user interface may host a webpage with a blue color scheme and imagery of a beach scene).

At 406, a media object repository (e.g., a database of images, social network posts from a social network service, a source of a live stream of video, an augmented reality experience, a virtual reality experience, videos of a video sharing service, etc.) may be queried using the content feature and the criteria to identify a media object associated with the content feature and the criteria. The media object repository may correspond to either stored media objects (e.g., the database of images) or real-time media objects (e.g., the virtual reality experience, the live stream of video, etc.). In an example, media objects of the media object repository may be pre-processed to facilitate querying. For example, a feature may be extracted from a media object of the media object repository (e.g., a feature identified from image recognition functionality, audio recognition functionality, entity classification functionality, annotations, a title, keywords, or other metadata). The feature may comprise a color distribution (e.g., an amount of blue, red, green, etc. depicted by the media object), a sentiment (e.g., the media object depicting two excited people at a sporting event), an aesthetic (e.g., a calming aesthetic of ocean waves, an exciting aesthetic of a sports car, etc.), a shot boundary or other camera or photo capturing features, a genre (e.g., sports, houses, jungle, vacation, or any other topic of theme), a semantic interpretation (e.g., a family on vacation, a couple on a honeymoon, a player scoring a goal, etc.), an amount of blur (e.g., blurry media objects such as from the social network service may be disqualified for composition), an adult content (e.g., adult media objects may be disqualified for composition), a recognized entity (e.g., a person, a location, a building, a car, a bike, etc.), etc. Responsive to the feature corresponding to the content feature of the content and/or the criteria above a selection threshold (e.g., a closest match compared to other media objects), the media object may be determined to be a candidate for identification as the media object. In an example, media objects within the set of media objects may be ranked based upon a degree of matching between features of the media objects and the content feature of the content and the criteria. In this way, the media object may be identified from the media object repository.

At 408, an area, within the media object into which the content can be added, is identified. In an example, image recognition functionality may be used to evaluate pixels of the media object to identify lines, shapes, clusters of similar colors, and/or other image features. In another example, audio recognition functionality may be used to evaluate an audio signal to identify audio features, such as pitch, frequency, voices, music, background noise, silence, etc. Entity recognition functionality may be used to determine that the lines, shapes, clusters of similar colors, and/or other image features are indicative of an entity, such as a person, a car, a tree, etc. (e.g., lines, shapes, and colors may be indicative of a tree; facial recognition may be used to identify a person from lines, shapes, and colors indicative of a human face). Semantic analysis may be used to identify semantic features of the media object (e.g., subject matter of the media object, a topic of the media object, actions being depicted by the media object, etc.). Because the media object may comprise a variety of locations/position at which the content may be added, it may be beneficial to efficiently identify an area that reduces occlusion (e.g., an area having an adequate amount of space that does not comprise visual features, such as a person, a tree, or other entity that may be relevant to a user; a time period of an audio stream with adequate silence or mere background noise; etc.), provides visual cohesiveness (e.g., an area with similar or complimentary color), semantic cohesiveness (e.g., an area depicting water over which a jet ski image could be added, as opposed to adding the ski image over a palm, tree depicted by the media object, which may otherwise appear to be random, arbitrary, and/or annoying), etc. For example, a topic of the content may be used to identify an area having a sematic feature that is similar to the topic (e.g., a baseball image may have a baseball topic and a sports topic, which may be more semantically relevant to an area of a downtown city photo depicting a stadium than to areas within which restaurants and other buildings are depicted).

At 410, the content may be added, such as overlaid or embedded, to the media object to create the composite media object (e.g., interactive racing game content such as a game interface and gaming functionality may be added into a fireworks image). In an example, the composite media object may comprise a single object, such as a single file into which the content and the media object are integrated, or may comprise multiple objects such as a multi-file. In an example, the content may be added to the media object in a manner that reduces occlusion of interesting visual features of the media object. For example, the fireworks image may be evaluated to identify visual features (e.g., a depiction of a person, a depiction of an object, a pixel color, textual information such as a message, etc.), such as an exploding firework in the sky and a person watching the exploding firework from a grassy field. An area (e.g., an area of pixels within which the interactive racing game content may fit) may be identified within the fireworks image so that the interactive racing game content may be added into the area without occluding the visual features such as the exploding firework or person, above a threshold amount (e.g., within an allowed occlusion specified by the criteria). For example, a plurality of candidate areas may be defined for the fireworks image, and the area may be identified as a candidate area having a desired (e.g., a minimized) occlusion (e.g., costs may be assigned to pixels, colors, or visual features such as a cost of 1 for green grass, a cost of 1 for blue sky, a cost of 5 for the exploding firework, and a cost of 3 for the person, and an area comprising pixels with minimized cost may be identified).

In an example, a topic of the content may be determined (e.g., a fast paced and exciting game topic). The area may be identified as having a visual feature relating to the topic (e.g., the exploding firework may be exciting and thus more similar to the fast paced and exciting game topic than the person sitting the grassy field, and thus the area may be defined within a sky near the exploding firework). In an example, a size or other property of the media object or the content may be modified to reduce occlusion of the visual features by the content. In this way, the content may be added into the area to create the composite media object. In an example, a visual aspect of the content and/or the media object may be modified for visual cohesiveness (e.g., fonts may be modified to a similar font, a color scheme may be modified to a similar color distribution, etc.).

In an example where the media object is a video (e.g., a soccer game video), a set of density maps, or any other data structure representative of frames of the video, may be generated for a sequence of frames of the video. Cost values may be assigned to values within the set of density maps (e.g., cost values may be associated with or assigned to pixels within the sequence of frames, which may be stored within the set of density maps or other data structures) based upon an occlusion criteria (e.g., the occlusion criteria may specify that pixels with white and blue colors are more desirable to occlude than pixels with other colors). For example, the criteria used to identify the media object may specify that a message "learn how to fly" content (e.g., a link to an article about how to fly) is more desirable to add over a sky area than a ground area of the media object, and thus the occlusion criteria may specify that blue and white colors may be assigned lower cost values than green and brown colors (e.g., a cost value of 5 may be assigned to brown pixels, a cost value of 4 may be assigned to green pixels, a cost value of 2 may be assigned to white pixels, and a cost value of 1 may be assigned to blue pixels) so that the message "learn how to fly" content is added over the sky area of the soccer game video instead of over the ground area of the soccer game video.

In an example, candidate areas may be defined for the sequence of frames, where a candidate area may comprise a shape and size (e.g., an amount of pixels) into which the content can be added. Total costs of values may be determined for each candidate area within the sequence of frames based upon the set of density maps (e.g., cost values of pixels within a candidate area of a frame may be added together to create a total cost value for that frame, which may be added to other total cost values for other frames within the sequence of frames for the candidate area to create a total cost of values for the candidate area over the sequence of frames). Responsive to a total cost of values of a particular candidate area being below a threshold (e.g., a candidate area with a minimized cost, such as having relatively more blue and/or white pixels and relatively less brown and/or green pixels than other candidate areas), the candidate area may be identified as an area into which the content is to be added. In another example, the cost values may be used to identify what sequence of frames (e.g., a number of frames corresponding to a display duration criteria specifying how long the content is to be displayed) has a candidate area with a total cost of values below the threshold and/or best matches the content feature and/or criteria. In this way, a sequence of frames and/or an area within that sequence of frames may be identified for placement of the content.

In another example where the media object is a live video stream, playback of the live video stream to the user may be delayed for a delay timespan for evaluating the live video stream to predict visual features that may subsequently occur or change position within the live video stream. One or more frames of the live video stream may be evaluated, such as during the delay of the live video stream, to predict a visual feature occurring within one or more subsequent frames of the live video stream (e.g., a soccer player running across a field may be predicted to continue running across the field according to a similar trajectory). An area of the live video stream into which the content can be added may be determined based upon the visual feature (e.g., so that the content does not occlude the soccer player running across the field).

At 412, the composite media object may be provided to the user. For example, the composite media object may be provided through the user interface, a virtual reality experience, an augmented reality experience, an application, a webpage, etc. In an example, the composite media object may be stored for subsequent use. In another example, the composite media object may be provided in real-time in response to a request for such, which may provide storage efficiency and savings compared to storing a large repository of combinations of composite media objects. In an example, in response to receiving user feedback regarding the composite media object (e.g., the user may indicate that the subject matter depicted in the media object is dissimilar to that of the content, and thus is not visually cohesive; users may interact with a dislike feedback interface instead of a like feedback interface to indicate that the users do not like content being overlaid a background of a panoramic image that may otherwise be interesting and/or visually pleasing to such users), the criteria used to identify media objects for composition with the content may be adjusted (e.g., a new subject matter criteria may be specified so that media objects depicting subject matter similar to that of the content may be selected for composition).

In an example, the content may be added into a set of media objects and/or various areas within the set of media objects to create a set of composite media objects. The set of composite media objects may be provided to users. User interactivity (e.g., user interaction, click-through rates, view time, etc.) with the set of composite media objects may be tracked. The set of composite media objects may be ranked based upon the user interactivity (e.g., higher ranks may be assigned to composite media objects with more user interactivity). In this way, composite media objects with higher ranks may be provided to users while composite media objects with lower ranks may be discarded, which may provide storage efficiency and savings compared to storing a large repository of combinations of composite media objects.

Figure 5:
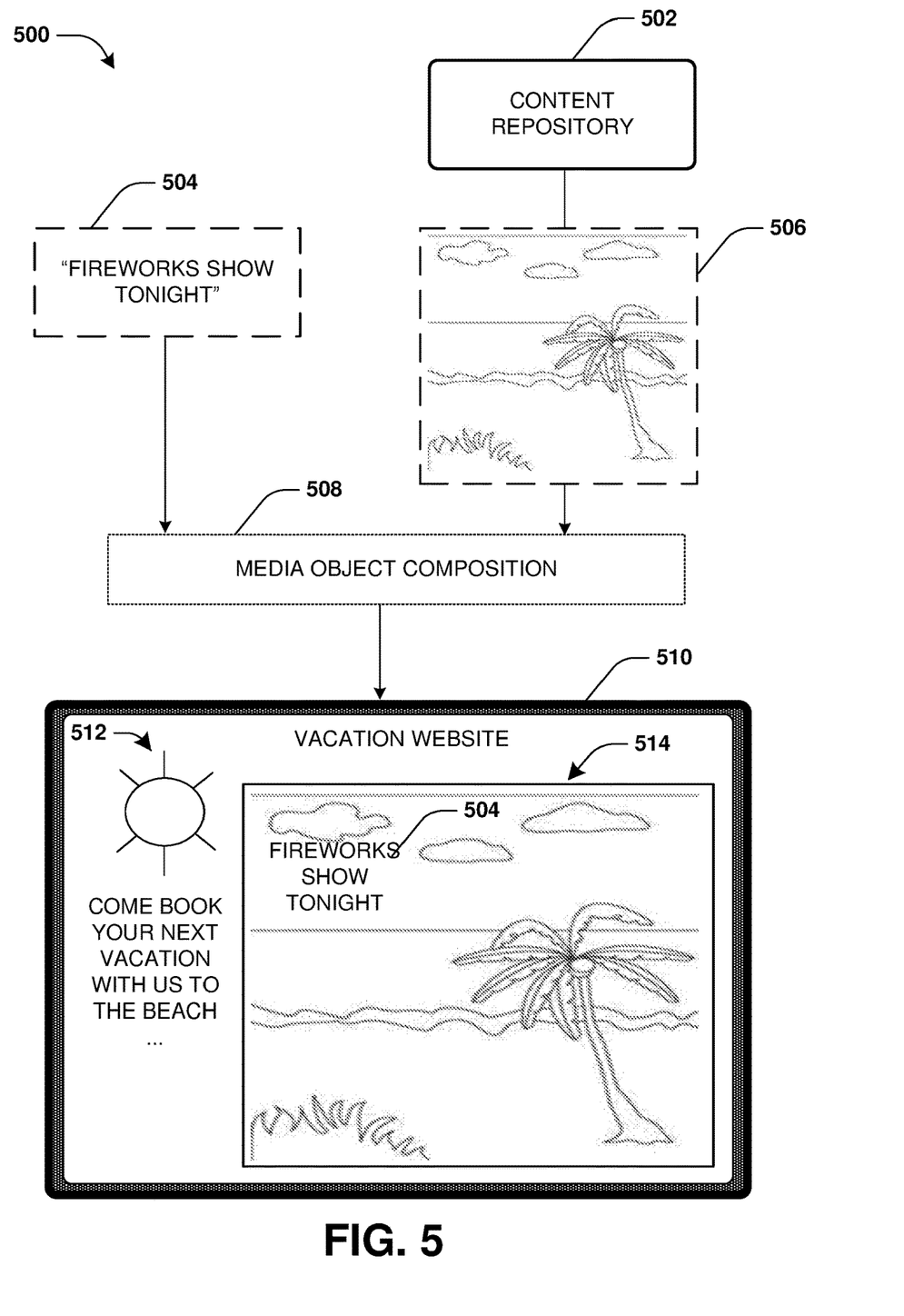
FIG. 5 is a component block diagram illustrating an example system for selective content insertion into areas of media objects, where a message is added to an image.

FIG. 5 illustrates an example of a system 500 for creating composite media objects. For example, a message "fireworks show tonight" content 504 may be identified as content to add to a media object. A content feature of the message "fireworks show tonight" content 504 may be identified such as a text color of grey, a pixel height and width, and a topic such as family fun, fireworks, and sky. A criteria for visually pairing the message "fireworks show tonight" content 504 may be optionally identified. For example, an entity that requested composition of the message "fireworks show tonight" content 504 into the media object may specify a media type preference of images, a vacation scene theme, etc. In an example where a vacation website 512 requests composition of the message "fireworks show tonight" content 504, the vacation website 512 may be evaluated to identify a color scheme, theme, and/or other features that may be used as the criteria.

Accordingly, a content repository 502 may be queried using the content feature and the criteria to identify a beach image 506 having features associated with (e.g., best matching) the content feature and the criteria. For example, metadata of the beach image 506 (e.g., a title, keywords associated with the beach image 506, a description or social network message posted with the beach image 506, annotations, features extracted by image recognition and entity identification functionality, etc.) may indicate that the beach image 506 is family fun, relaxing, and depicts a blue sky, clouds, a beach, water, a palm tree, and a bush. An area within the beach image 506 may be identified based upon the criteria indicating that the message "fireworks show tonight" content 504 may be visually and/or semantically cohesive with blue, such as the blue sky (e.g., as opposed to tan of the sand or green of the palm tree and bush because fireworks may be more semantically relevant with sky than ground), and/or based upon a reduced (e.g., minimized) occlusion by the message "fireworks show tonight" content 504 of visual features such as the palm tree and the bush (e.g., less occlusion may occur by adding the message "fireworks show tonight" content 504 over the sky than the water or beach due to the palm tree and bush being closer to the water and beach). In this way, the message "fireworks show tonight" content 504 may be composited 508, such as overlaid or embedded, into the beach image 506 to create a composite media object 514, such as for display through the vacation website 512 hosted by a device 510.

Figure 6:
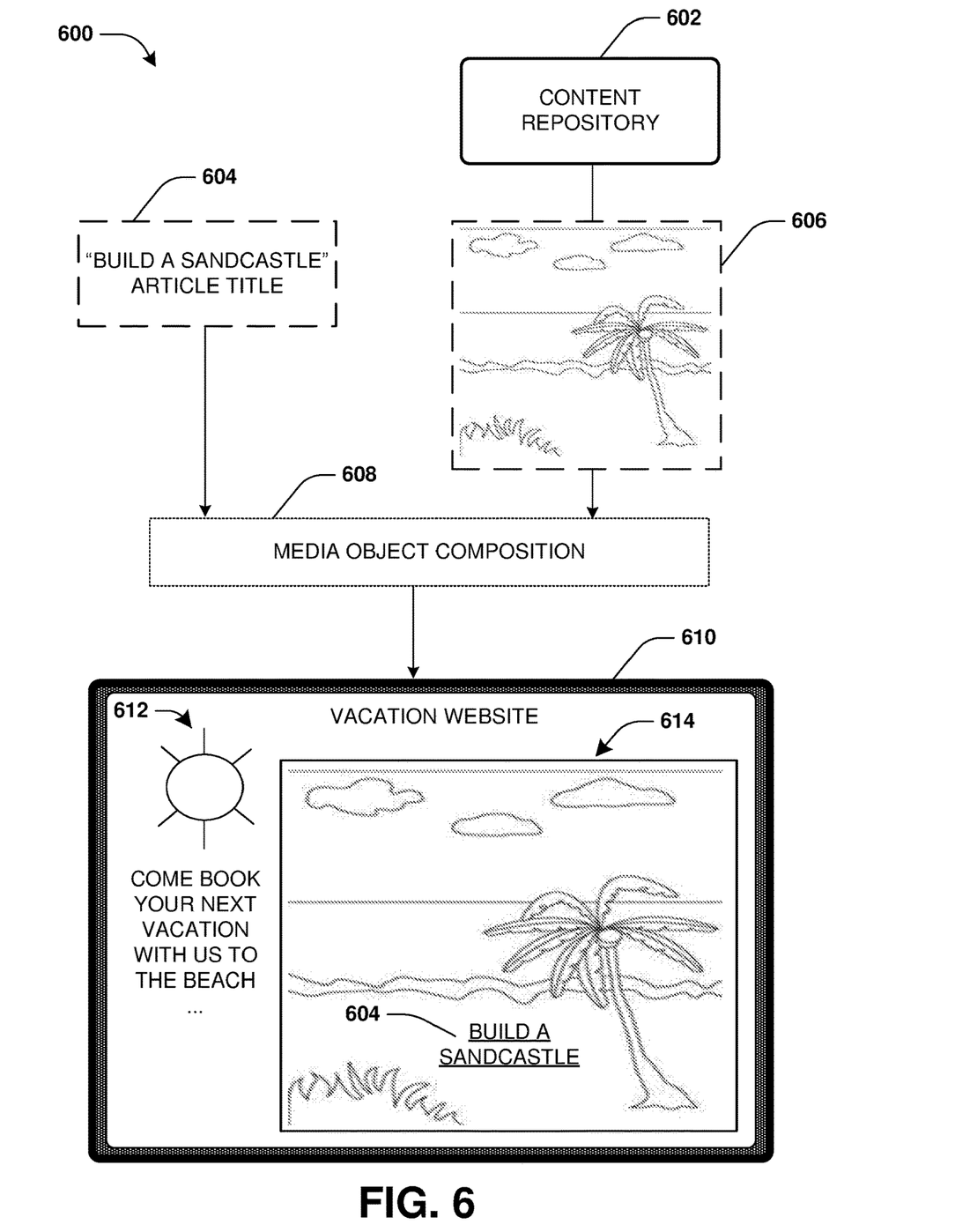
FIG. 6 is a component block diagram illustrating an example system for selective content insertion into areas of media objects, where a message is added to an image.

FIG. 6 illustrates an example of a system 600 for creating composite media objects, where a matching area (e.g., a best matching area) within an image for adding content is dependent upon features of the content and any specified criteria. For example, an article title "build a sandcastle" content 604 may be identified as content to add into a media object. The article title "build a sandcastle" may comprise a link to an article about fun sandcastles to build. A content feature of the article title "build a sandcastle" content 604 may be identified such as a text color of brown, a pixel height and width, a topic such as beach activities, etc. A criteria for visually pairing the article title "build a sandcastle" content 604 may be optionally identified. For example, an entity that requested composition of the article title "build a sandcastle" content 604 into the media object may specify a media type preference of images, a vacation scene theme, etc. In an example where a vacation website 612 requests composition of the article title "build a sandcastle" content 604, the vacation website 612 may be evaluated to identify a color scheme, theme, and/or other features that may be used as the criteria.

Accordingly, a content repository 602 may be queried using the content feature and the criteria to identify a beach image 606 having features associated with (e.g., best matching) the content feature and the criteria. For example, metadata of the beach image 606 (e.g., a title, keywords associated with the beach image 606, a description or social network message posted with the beach image 606, annotations, features extracted by image recognition and entity identification functionality, etc.) may indicate that the beach image 606 is inspirational, relaxing, has a beach vacation theme, and depicts a blue sky, clouds, a beach, water, a palm tree, and a bush. An area within the beach image 606 may be identified based upon the criteria indicating that the article title "build a sandcastle" content 604 may be semantically similar to sand of the beach, (e.g., the beach activity topic may be more similar to the sand of the beach than to the blue sky or clouds) and/or based upon a reduced (e.g., minimized) occlusion by the article title "build a sandcastle" content 604 of visual features such as the palm tree and the bush. In this way, the article title "build a sandcastle" content 604 may be may be composited 608, such as overlaid or embedded, into the beach image 606 to create a composite media object 614, such as for display through the vacation website 612 hosted by a device 610. The article title "build a sandcastle" content 604 may be added as a link that links to the article about sandcastles.

In an example, user feedback may be received for the composition 608. The user feedback may indicate that the brown text color of the article title "build a sandcastle" content 604 is difficult to see over the tan sand of the beach. Accordingly, the article title "build a sandcastle" content 604 may be modified to have a black text color for improved visibility. In this way, the composite media object 614 may be updated with the article title "build a sandcastle" content 604 having the black text color. In another example, the article title "build a sandcastle" content 604 may retain the brown text color, but a new area of the article title "build a sandcastle" content 604 may be chosen to improve visibility (e.g., over the water near the beach).

Figure 7A:
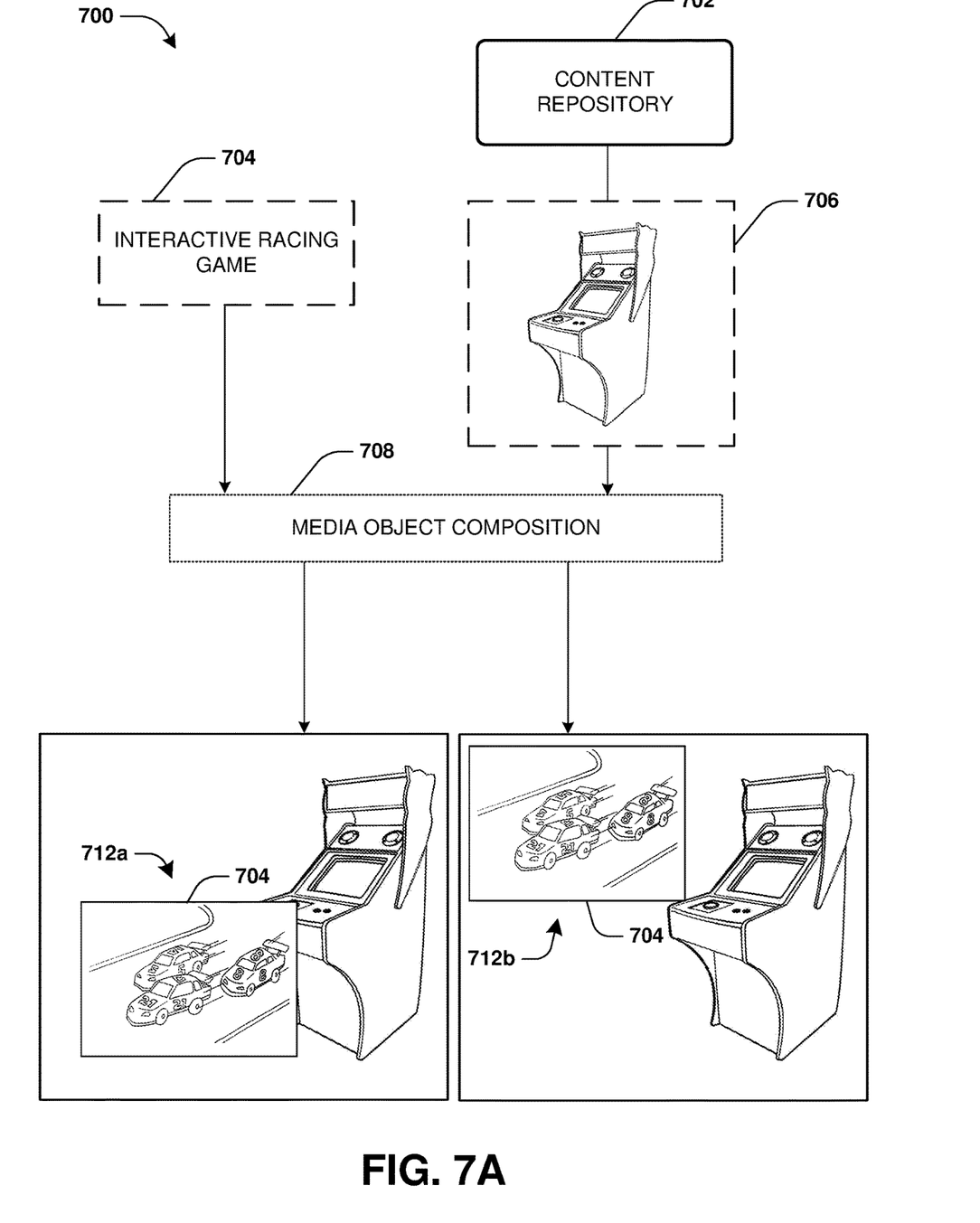
FIG. 7A is a component block diagram illustrating an example system for selective content insertion into areas of media objects, where one or more candidate areas are defined and evaluated.
Figure 7B:
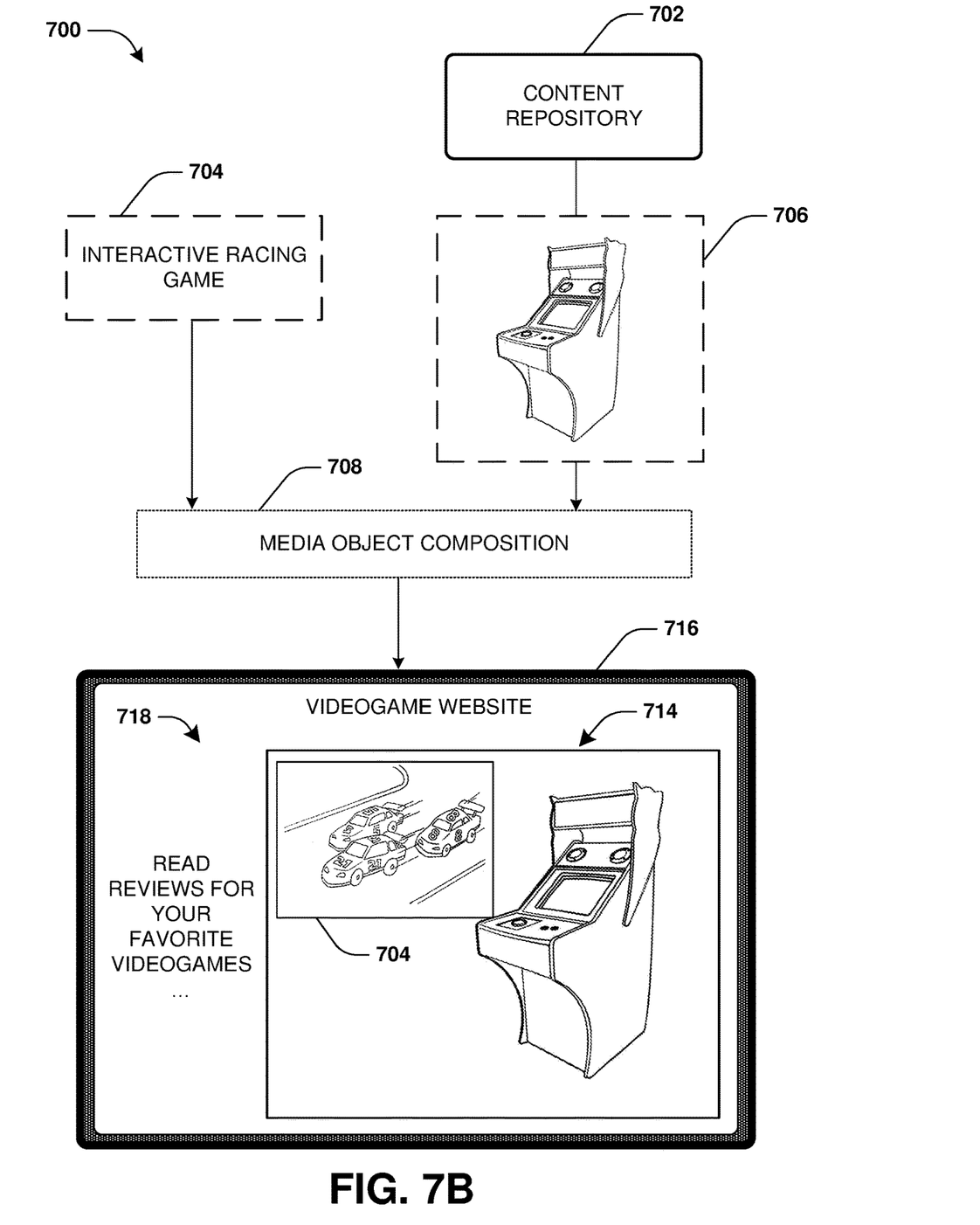
FIG. 7B is a component block diagram illustrating an example system for selective content insertion into areas of media objects, where an interactive game is added to an image.

FIGS. 7A and 7B illustrate an example of a system 700 for creating composite media objects. For example, interactive racing game content 704 may be identified as content to add into a media object, as illustrated in FIG. 7A. A content feature of the interactive racing game content 704 may be identified such as a sports theme, a desired display resolution, etc. A criteria for visually pairing the interactive racing game content 704 may be optionally identified. For example, an entity that requested composition of the interactive racing game content 704 into the media object may specify a media type preference of images, a videogame theme, etc.

Accordingly, a content repository 702 may be queried using the content feature and the criteria to identify a videogame arcade machine image 706 having features associated with (e.g., best matching) the content feature and the criteria. Various candidate areas may be defined within the videogame arcade machine image 706 into which the interactive racing game content 704 could be added. For example, a first candidate area 712a may be defined within a lower left portion of the videogame arcade machine image 706, a second candidate area 712b may be defined within an upper left portion of the videogame arcade machine image 706, and/or a plurality of other candidate areas may be defined. An area may be selected from the candidate areas based upon various factors such as an occlusion factor and/or a semantically similar or dissimilarity factor. For example, the second candidate area 712b may be selected over the first candidate area 712a because adding the interactive racing game content 704 into the second candidate area 712b provides for reduced occlusion of a visual feature, such as a videogame arcade machine, than if the interactive racing game content 704 was added into the first candidate area 712a. FIG. 7B illustrates the interactive racing game content 704 being composited 708, such as overlaid or embedded, into the second candidate area 712b of the videogame arcade machine image 706 to create a composite media object 714, such as for display through a videogame website 718 hosted by a device 716.

Figure 8:
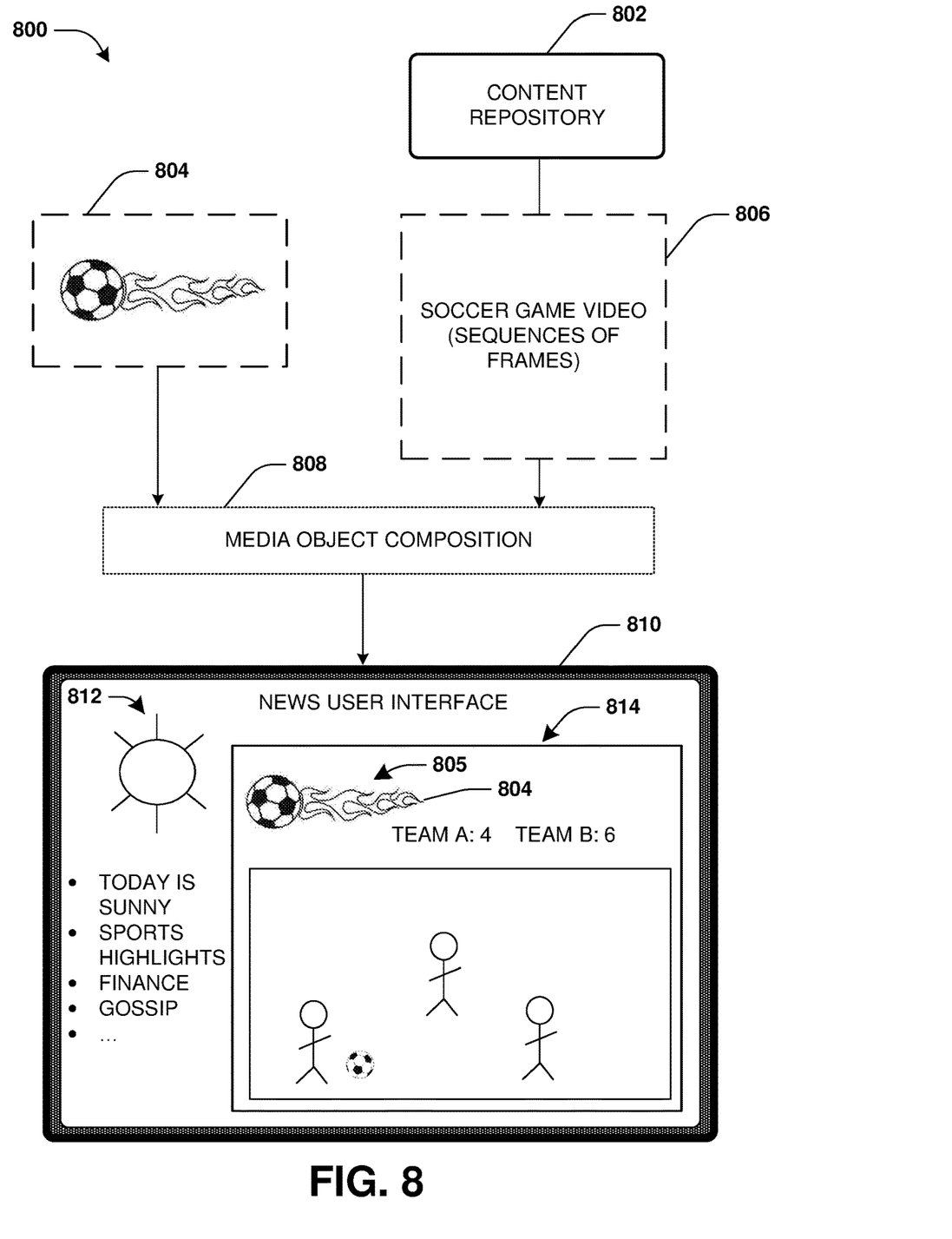
FIG. 8 is a component block diagram illustrating an example system for selective content insertion into areas of media objects, where an image is added to a video.

FIG. 8 illustrates an example of a system 800 for creating composite media objects. For example, soccer logo content 804 may be identified as content to add into a media object. A content feature of the soccer logo content 804 may be identified such as a logo color of blue, a pixel height and width, a topic of sports, etc. A criteria for visually pairing the soccer logo content 804 may be optionally identified. For example, an entity that requested composition of the soccer logo content 804 into the media object may specify a media type preference of video, a sporting event theme, a soccer player kicking a ball semantic interpretation, a display duration of 10 seconds, etc.

Accordingly, a content repository 802 may be queried using the content feature and the criteria to identify a soccer game video 806. For example, metadata of the soccer game video 806 such as a title and/or features of the soccer game video 806 identified using image recognition functionality, may indicate that the soccer game video 806 relates to the sporting event theme, has mainly green and blue colors that correspond to the soccer color of blue of the soccer logo content 804, and depicts a soccer player kicking a ball. Sequences of frames, corresponding to durations of 10 seconds, may be evaluated to identify a sequence of frames and an area into which the soccer logo content 804 can be added without visually occluding visual features within the sequence of frames above a threshold amount. For example, a top left area 805 of the sequence of frames may be identified as not occluding a soccer field, soccer players, sports scores, a soccer ball, and/or other visual features of the sequence of frames. Accordingly, the soccer logo content 804 may be composited 808, such as overlaid or embedded, into the sequence of frames at the top left area 805 to create a composite media object 814, such as for display through a news user interface 812 hosted by a device 810.

Figure 9:
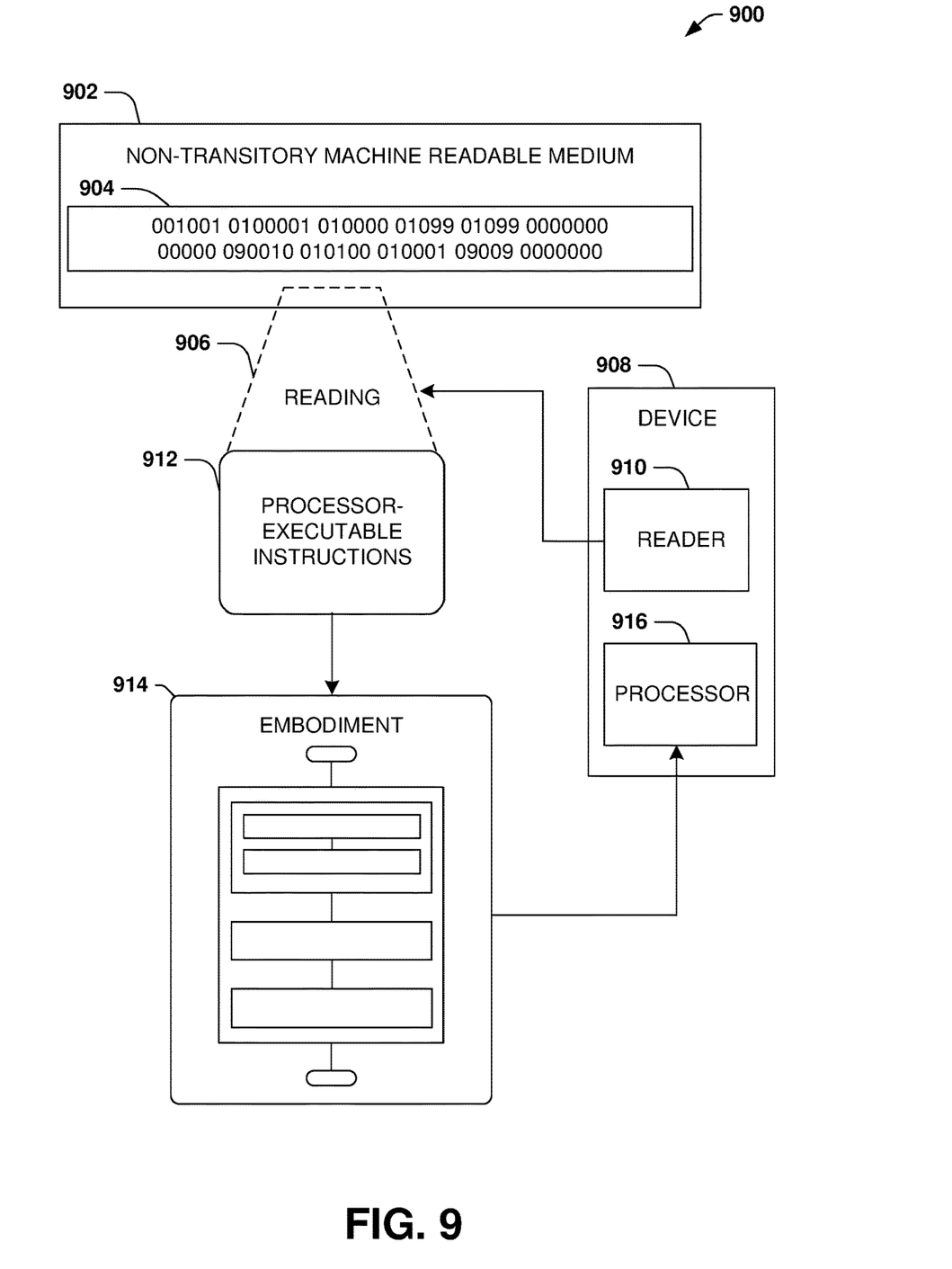
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 400 of FIG. 4, for example. In some embodiments, the processor-executable instructions 912 are configured to cause implementation of a system, such as at least some of the example system 500 of FIG. 5, at least some of the example system 600 of FIG. 6, at least some of the example system 700 of FIG. 7, and/or at least some of the example system 800 of FIG. 8, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc.

For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method of selective content insertion into areas of media objects, the method involving a server comprising a processor, and the method comprising:
   executing, on the processor, instructions that cause the server to perform operations, the operations comprising:
      identifying a content feature of content;
      identifying criteria for pairing the content with media objects;
      querying a media object repository using the content feature and the criteria to identify a media object associated with the content feature and the criteria;
      assigning cost values to one or more portions of the media object based upon an occlusion criteria;
      identifying an area within the media object into which the content is to be added; and
      responsive to determining that the area of the media object has a total cost value below a threshold, automatically generating a composite media object by adding the content into the area.

2. The method of claim 1, wherein the adding the content comprises at least one of:
   overlaying the content over the media object to create the composite media object; or
   embedding the content into the media object to create the composite media object.

3. The method of claim 1, wherein the adding the content comprises:
   evaluating the media object of the media object repository to identify a feature of the media object, wherein the feature comprises at least one of a visual feature or an aural feature;
   identifying the area within the media object into which the content can be added without occluding the feature above a threshold amount; and
   adding the content into the area to create the composite media object.

4. The method of claim 3, wherein the adding the content comprises:
   modifying at least one of the media object or the content to reduce occlusion of the feature by the content.

5. The method of claim 1, wherein the media object is an audio media object, and the area is a temporal period of the audio media object.

6. The method of claim 1, wherein the adding the content comprises:
   determining a topic of the content;
   evaluating the media object of the media object repository to identify a feature of the media object as relating to the topic;
   identifying the area within the media object as being associated with the feature; and
   adding the content into the area to create the composite media object.

7. The method of claim 1, wherein the media object is a live video stream, and the method comprises:
   delaying playback of the live video stream to a user for a delay timespan;
   evaluating one or more image frames or audio samples of the live video stream to predict a feature occurring within one or more subsequent image frames or audio samples of the live video stream; and determining the area of the live video stream to add the content based upon the feature.

8. The method of claim 1, comprising:
generating a density map for one or more image frames or audio samples of the media object.

9. The method of claim 1, comprising:
generating a set of density maps for one or more image frames or audio samples; and
determining a total cost of values based upon the set of density maps.

10. The method of claim 1, comprising:
responsive to receiving a request in real-time from a user interface for the content, creating the composite media object to provide through the user interface.

11. The method of claim 10, wherein the identifying criteria comprises:
evaluating the user interface to identify a context of the user interface as the criteria.

12. The method of claim 1, wherein the identifying criteria comprises:
evaluating user signals of a user to identify an interest of the user as the criteria.

13. The method of claim 1, wherein the criteria comprises at least one of a visual criteria or an aural criteria.

14. The method of claim 1, wherein the content feature comprises at least one of a visual feature or an aural feature.

15. The method of claim 1, comprising:
responsive to receiving feedback from a user regarding the composite media object, adjusting the criteria based upon the feedback.

16. The method of claim 1, comprising:
adding the content into a set of media objects to create a set of composite media objects;
providing the set of composite media objects to users;
tracking user interactivity with the set of composite media objects; and
ranking the set of composite media objects based upon the user interactivity.

17. The method of claim 1, wherein the querying a media object repository comprises:
extracting a feature from a candidate media object of the media object repository, the feature comprising at least one of a visual feature or an aural feature; and
responsive to the feature corresponding to the content feature and the criteria above a selection threshold, selecting the candidate media object as the media object.

18. The method of claim 1, wherein the querying a media object repository comprises:
ranking second media objects based upon a degree of matching between features of the second media objects and the content feature and the criteria.

19. A computing device comprising:
a processor; and
memory comprising processor-executable instructions that when executed by the processor cause performance of operations, the operations comprising:
identifying a content feature of content;
identifying criteria for pairing the content with media objects;
querying a media object repository using the content feature and the criteria to identify a media object;
assigning cost values to one or more portions of the media object based upon an occlusion criteria;
evaluating the media object to identify an area within the media object into which the content can be added; and
responsive to determining that the area of the media object has a total cost value below a threshold, automatically generating a composite media object by adding the content into the area.

20. A non-transitory machine readable medium having stored thereon processor-executable instructions that when executed cause performance of operations, the operations comprising:
identifying a content feature of content;
identifying criteria for pairing the content with media objects;
querying a media object repository using the content feature and the criteria to identify a media object;
assigning cost values to one or more image frames or audio samples of the media object based upon an occlusion criteria;
identifying an area of the media object; and
responsive to determining that the area of the media object has a total cost value below a threshold, automatically generating a composite media object by adding the content into the area.

* * * * *